United States Patent
Mackiewicz

(10) Patent No.: US 7,695,075 B1
(45) Date of Patent: Apr. 13, 2010

(54) DISC THICKNESS VARIATION COMPENSATION

(75) Inventor: John Edmund Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 11/856,747

(22) Filed: Sep. 18, 2007

(51) Int. Cl.
*B60T 8/32* (2006.01)

(52) U.S. Cl. ..................................... 303/191; 188/18 A

(58) Field of Classification Search ............... 188/18 A, 188/158; 303/3, 7, 20, 191; 324/161
See application file for complete search history.

(56) References Cited

U.S. PATENT DOCUMENTS

| | | | |
|---|---|---|---|
| 4,877,113 A | 10/1989 | Taig | |
| 6,087,826 A * | 7/2000 | Donath | 324/161 |
| 6,322,160 B1 | 11/2001 | Loh et al. | |
| 6,375,281 B1* | 4/2002 | Angerfors | 303/176 |
| 6,378,669 B1 | 4/2002 | Kurasako et al. | |
| 6,607,252 B2* | 8/2003 | Weng et al. | 303/87 |
| 7,219,778 B2* | 5/2007 | Pete et al. | 188/218 XL |
| 2002/0029939 A1* | 3/2002 | Bunker | 188/18 A |
| 2004/0046444 A1* | 3/2004 | Heubner et al. | 303/113.5 |
| 2004/0104618 A1* | 6/2004 | Yamamoto et al. | 303/20 |
| 2005/0067233 A1* | 3/2005 | Nilsson et al. | 188/158 |
| 2005/0264102 A1* | 12/2005 | Tezuka | 303/152 |
| 2005/0269875 A1* | 12/2005 | Maki et al. | 303/152 |
| 2008/0067867 A1* | 3/2008 | Taguchi | 303/167 |

* cited by examiner

*Primary Examiner*—Christopher P Schwartz
(74) *Attorney, Agent, or Firm*—Maginot, Moore & Beck

(57) ABSTRACT

A vehicle braking system of the type having individually controlled brakes with respective angularly fixed (17, 19) and rotatable (11) friction surfaces urged into contact by an operator initiated (35, 65) braking force for each of a plurality of rotatable vehicle wheels has braking torque variations within a wheel revolution alleviated for each wheel by sensing variations in braking force (45, 71) as a function of wheel angular position (49, 77) during a complete vehicle wheel revolution and initiating (59) a reduction in braking force during a subsequent wheel revolution prior to the wheel reaching an angular position (87) at which an increase in braking force was sensed during a previous wheel revolution. A particular wheel angular position may be identified as a reference position and data indicative of the sensed variations stored (51, 75) as a function of wheel angular position relative to the reference position. This stored data is then utilizing (63, 59) to determine the angular position (85) at which braking force reduction is initiated. Identification of a reference position may be directly done by sensing an angular anomaly (49) generated by the wheel speed sensor, or indirectly by storing (53, 81) data indicative of the sensed variations, analyzing (55, 83) the stored data to identify any established patterns within the data, and identifying a particular wheel angular position as a reference position based on an identified repetitive pattern.

4 Claims, 3 Drawing Sheets

DISC THICKNESS VARIATION COMPENSATION

BACKGROUND OF THE INVENTION

The present invention relates to vehicle braking systems and more particularly to compensation techniques for problems created by irregularities in braking surfaces, such as disc thickness variations in electrically or hydraulically actuable disc brakes, to reduce braking surface induced braking torque variations.

DESCRIPTION OF THE RELATED ART

Both drum and disc brakes are commonplace on todays vehicles. Drum brakes have an annular drum fixed to a wheel with a set of brake shoes which expand outwardly upon application of hydraulic pressure to a wheel cylinder to engage the drum interior thereby braking the wheel. Disc brakes have a rotatable disc or rotor fixed to a wheel and a spanning caliper unit supporting friction pads near each disc face. Application of hydraulic pressure to a wheel cylinder applies a clamping force causing the jaws of the caliper to close toward one another forcing the pads to engage the opposite disc faces braking the wheel.

These braking systems are typically hydraulically operated and often include an antilock (ABS) feature. Many newer vehicles provide additional features known as electronic stability programs (ESP) to enhance vehicle stability. These known ABS and ESP systems typically have an electronic control unit (ECU) which receives signals from individual wheel speed sensors and other transducers for controlling hydraulic pressure modulators to release and reapply braking forces to the wheels. Some braking systems are electrically actuated. For example, U.S. Pat. No. 4,877,113 teaches an electric disc brake where a vehicle operator commanded clamping force enables an electric actuator to brake the wheel.

Drum or disc eccentricities or other irregularities may induce undesirable vibrations during braking. For example, Disc Thickness Variation (DTV) of a rotor directly causes Brake Torque Variation (BTV). As the thicker portion of the rotor passes through the disc brake caliper/brake pads, the resistance of the brake to open up to accommodate the additional rotor thickness causes the clamp force of the caliper to increase and thereby increases the brake torque.

U.S. Pat. No. 6,322,160 recognized that operational characteristics of a brake could cause changes in hydraulic fluid pressure inducing vibrations. The patentees introduced a spring-loaded hydraulic damper in the brake line in an attempt to attenuate tactile vibration caused by hydraulic fluid pressure changes induced in a hydraulic brake system by a characteristic of a hydraulic-operated brake when the brake is being actuated to apply brake torque to a rotating object.

U.S. Pat. No. 6,607,252 recognized the existence of disc thickness variations and the accompanying brake torque variations and attempted to dissipate hydraulic pressure waves in an enlarged circular chamber. The patentees point out that vehicles having a hydraulic brake system have experienced brake torque variation due to disc thickness variation (DTV) in the rotor of disc brakes or insufficient cylindricity of the drum in drum brakes. The forces created by the brake torque variation are transmitted to the tire of the vehicle and cause the tires of the vehicle to vibrate in the longitudinal direction of the tire. This vibration is thereafter transmitted to the brake system and chassis of the vehicle and results in brake roughness. Brake roughness is defined as the unexpected vibration that the driver of the vehicle feels through the steering wheel, brake pedal and seat track. The vibration associated with brake roughness can be transmitted to the driver of the vehicle, causing the driver to feel the vibrations. They concluded the prior art hydraulic brake system with a DTV less than 6 microns did not experience significant brake torque variation, but when the DTV of the prior art rotor is 30 microns, the brake torque variation can become significant. The solution suggested in this patent involves a circular enlarged drum in which a pressure wave in the fluid entering the substantially circular enlarged flow chamber from a fluid line will be forced to move in a substantially circular path and reflect off of the peripheral wall at a plurality of points to thereby dissipate the pressure wave. These two patented systems attempt to react to pressure changes when those changes occur.

U.S. Pat. No. 6,378,669 recognizes it is difficult to set the rotating axis of a wheel perfectly perpendicular to a brake disc. Therefore, it is often the case that a brake disc slightly wobbles while rotating. If brake pads are pressed against a brake disc turning in a wobbling state, there occurs a slight wall thickness variation in a circumferential direction of the brake disc. Occurrence of such a variation in wall thickness may become a cause of vibrations of the wheel during braking, or may cause the reaction force exerted on the brake pedal to finely fluctuate, and may give a disagreeable feel to a driver of the vehicle. The patented system utilizes an ECU, pressure sensors for measuring the oil pressures in the wheel cylinders and the wheel speed sensors for detecting the rotational positions of the brake discs to function as a wall thickness variation detector. A state of the wall thickness of the brake disc is stored in correspondence to the rotational position (angle) of the brake disc. The brake pads are placed in contact with the increased wall thickness portion of the brake disc by a strong pressing force, and are placed in contact with the relatively small wall thickness portion of the brake disc by a weak pressing force, so that the wall thickness variation of the brake disc is quickly eliminated. The oil pressure control eliminates the wall thickness variation of a brake disc by planing (i.e., removing material from) an increased wall thickness portion of the brake disc, and avoids contact of the brake pads with a relatively small-wall thickness portion of the brake disc, so that the wear of the brake disc can be reduced. The state of contact between the brake disc and the friction member may be controlled while a vehicle is not under braking. Therefore, since the control for eliminating (suppressing) a variation in the wall thickness of the brake disc is performed while the vehicle is not under braking, the state of contact between the brake disc and the friction member can be set to an optimal state for eliminating (suppressing) the wall thickness variation of the brake disc. The patentees are, in essence, introducing intentional wear, preferably when the brakes are not being applied, to true-up (reduce or eliminate wobble of) a rotor. It is desirable to lessen or avoid the adverse effects of manufacturing imperfections, wear or heat induced warping or distortion, off-axis mounting and other irregularities in braking surfaces.

SUMMARY OF THE INVENTION

The present invention provides an anticipatory corrective action for a recurring braking surface anomaly by recognizing a repeated pattern and providing a prepared synchronized response.

The invention comprises, in one form thereof, a method of alleviating disc brake rotor induced braking torque variations by applying a relatively constant braking force to the rotor and observing fluctuations of the relatively constant braking force. The rotor angular position is monitored, and the observed braking force fluctuations and monitored rotor angular position utilized to anticipate a future fluctuation in braking force. The applied braking force is relieved if the anticipated braking force fluctuation is an increase and increased if the anticipated braking force fluctuation is a decrease to moderate the adverse effects of irregularities in disc thickness.

Also in general, and in one form of the invention, a method of compensating for irregularities in disc brake rotor thickness in a vehicle disc braking system includes monitoring applied braking force during a braking event throughout at least one complete rotor revolution and recording variations in the monitored braking force throughout the complete rotor revolution. Subsequent variations in applied braking force are compared with the recorded variations to establish a rotor angular reference position, and the applied braking force anticipatively varied to ameliorate the adverse effects of rotor thickness variations.

An advantage of the present invention is that a more uniform braking torque is provided throughout complete wheel rotations.

BRIEF DESCRIPTION OF THE DRAWINGS

Corresponding reference characters indicate corresponding parts throughout the several drawing views.

DETAILED DESCRIPTION OF THE INVENTION

Figure 1:
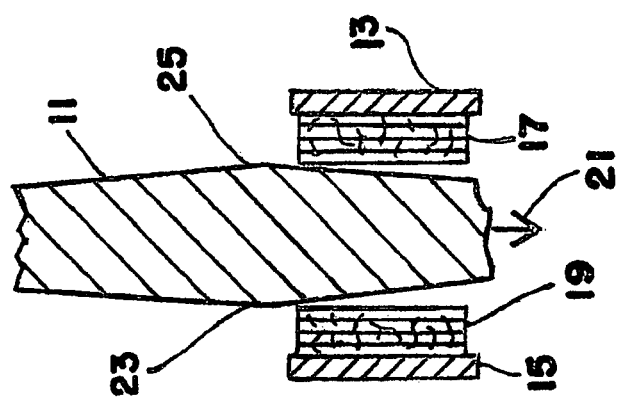
FIG. 1 is a partial cross-sectional view of a brake system rotor and spanning friction pads.

Referring now to the drawings and particularly to FIG. 1, there is shown a cross-sectional view of a portion of a disc brake system. Wheel mounted rotor 11 is spanned by a brake caliper having a pair of jaws 13 and 15 which may be urged toward one another by the application of hydraulic fluid pressure to a conventional wheel cylinder (not shown). The caliper supports respective friction pads 17 and 19 which are forced into braking engagement with the rotor 11 upon application of hydraulic pressure. The thickness of the rotor section is nonuniform with the greatest thickness depicted between points 23 and 25. If the rotor section depicted is moving between the pads 17 and 19 in the direction of arrow 21, the pads as well as jaws 13 and 15 will be forced away from one another by the approaching region of greatest thickness resulting in an increase in the cylinder hydraulic pressure and an increase in braking torque. Subsequent passage of the thicker portion from between the pads will be accompanied by a reduction in braking torque and lowering of the hydraulic cylinder pressure.

Figure 2:
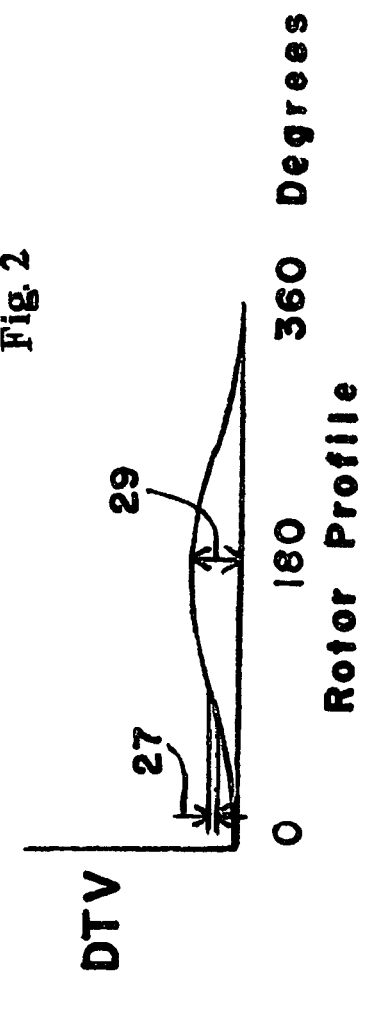
FIG. 2 is a graph showing an illustrative rotor profile with thickness variation as a function of relative angular position.

An illustrative profile for rotor 11 is shown in FIG. 2 where the thickness begins increasing from some standard or reference thickness at zero degrees reaching a maximum deviation near the midpoint of its revolution and returning to the standard thickness near the end of one complete revolution. The greatest thickness variation 29, of course occurs as the thickest region 23, 25 passes between the pads of FIG. 1. For the disc thickness variation pattern shown in FIG. 2, a relatively constant braking force command would result in a nearly identical braking force torque variation pattern as shown at 33 in FIG. 3.

Figure 3:
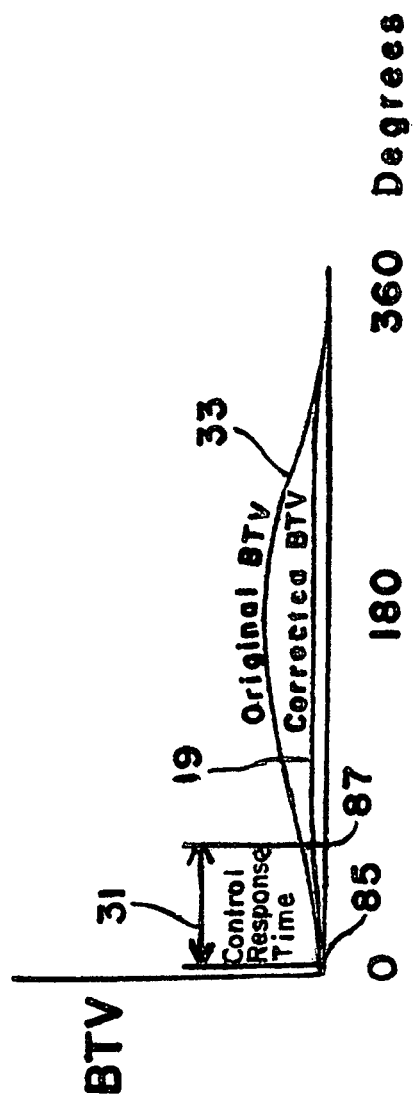
FIG. 3 is a graph comparing uncorrected and corrected variations in braking torque as a function of relative angular position for the illustrative rotor of FIG. 2.

As shown in FIG. 2, the measurement and discernment of increment 27 is difficult as it is very small, whether measured in DTV or its corresponding BTV. Measurement 29 is much easier to measure and recognize as a departure from normal DTV or BTV. However, by the time this threshold is reached, the system cannot react fast enough to limit or reduce the higher brake torque. In the illustrations of FIGS. 2 and 3, the control response time 31 is shown as about one-sixth of one wheel revolution. The system needs to allow for the control response time by anticipating the need for correction. It will be understood that this is merely an illustrative rotor profile and the illustrated rotor thickness variation is only one example of the multitude of possible variation patterns.

Figure 4:
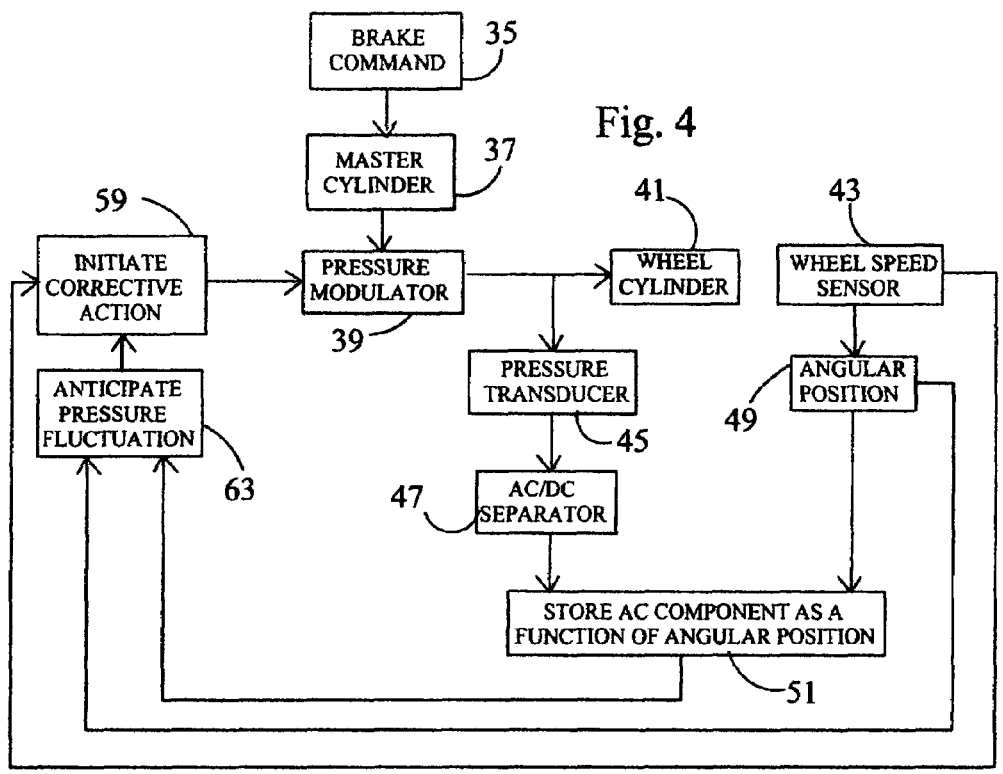
FIG. 4 is a block diagram illustrating one technique of compensation for disc thickness variations in a hydraulic antilock braking system.

In FIG. 4, when a vehicle operator depresses the brake pedal, a brake command 35 enables the master cylinder 37 to supply pressure fluid by way of pressure modulator 39 to the wheel cylinder 41 to brake wheel rotation. The pressure modulator 39 and wheel speed sensor 43 are conventional ABS or ESP components which cooperate with an electronic control unit to alternately bleed and build wheel cylinder fluid pressure upon sensing an imminent locking of the wheel. During a low or moderate force brake apply, a signal from a pressure transducer 45 located in or coupled to the ABS or ESP modulator 39 can record the hydraulic pressure applied to wheel cylinder 41. It will be understood that there will be at least a pressure modulator, wheel cylinder, wheel speed sensor and pressure transducer for each of several different vehicle wheels and the hydraulic pressure applied to each wheel cylinder for each corresponding brake/brake channel will be recorded. The ABS or ESP ECU can monitor each of these signals and separate the AC (transient) portion of the signal from the DC (relatively steady state) portion of the signal as indicated at 47. The DC portion of the signal represents the mean apply pressure and the AC portion represents the changes in brake pressure due to the DTV of the rotor. In this way, indirect detection of the rotor DTV is recognized and recorded for each revolution of each rotor. The registration or synchronization of this pressure/DTV mapping can be made to the absolute rotor position by either an inferred or a direct method.

The direct method uses an ABS wheel speed sensor 43 with a special tooth or other indicia to denote a synchronizing point on the rotor. The tooth can be configured to provide a larger voltage signal or a prolonged one sensed at 49. Other suitable techniques for identifying an angular rotor reference such as counting a known number of wheel speed sensor teeth may be employed. In this way, the pressure variations may be stored at 51 as a function of the rotor angular orientation. Either analog or periodic digital sample values may be stored. An angular position at which an undesired change in the pressure will occur and the current rotor angular position from sensor 43 allow circuit 63 to anticipate that change. Knowing the system response time and current measured wheel speed from sensor 43, a corrective action (hydraulic pressure increase or decrease) is initiated at 59.

Figure 5:
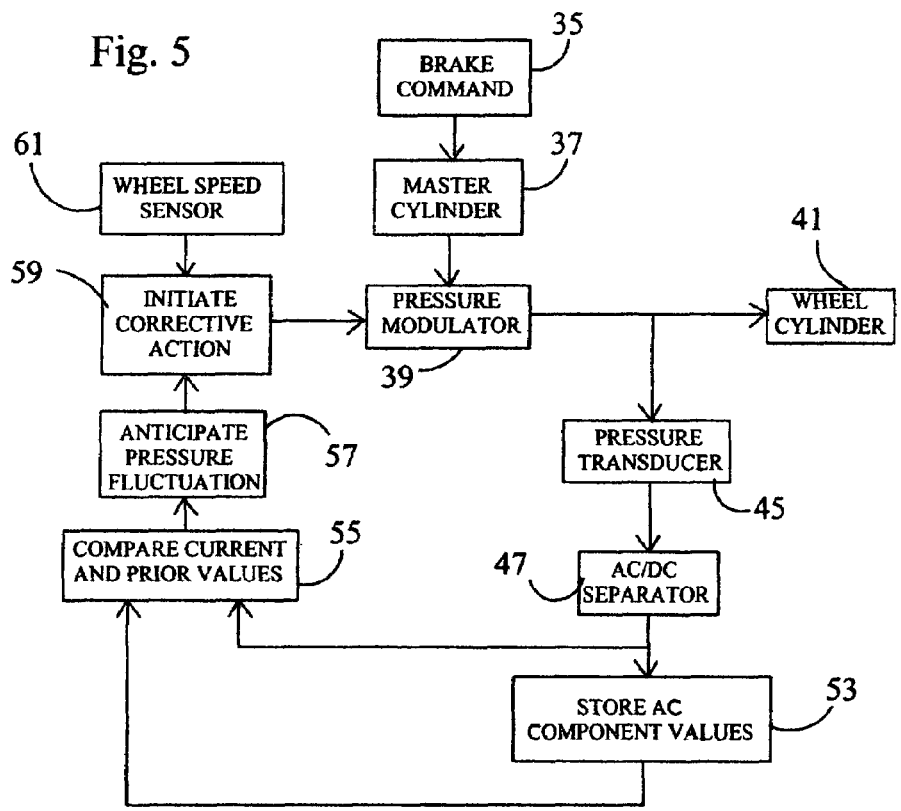
FIG. 5 is a block diagram illustrating another technique of compensation for disc thickness variations in a hydraulic antilock braking system.

The inferred method is illustrated in FIG. 5 which lacks the angular position sensing function 49. Here, a BTV circumferential profile of the rotor is recorded at 53 and then synchronized to a selected point on the rotor circumferentially. A comparison circuit 55 is designed to recognize a repetition of a pattern previously stored at 53. As a simple example, if the rotor thickness varies sinusoidally, the ninety degree maximum or two hundred seventy degree minimum values are easily identified. After the two hundred seventy degree minimum, the next occurring zero value would be zero degrees where circuit 57 recognizes an undesired increase in the pressure will occur. Somewhat prior to zero degrees, as determined by the system response time and current measured wheel speed from sensor 61, the circuit 59 initiates a pressure reduction. In other words, the logic can know which portion of the rotor is passing through the brake by constantly recognizing and syncing to the previously recorded profile. The pressure records or mappings may all be stored in a common memory and the functions of AC separation, comparison, anticipation and initiation of corrective action all performed for each wheel by the ECU.

With either the method of FIG. 4, or of FIG. 5, or a combination of the two, an ongoing algorithm can be used to continually monitor and update the rotor DTV profile stored at 51 or 53, as it will change over the life of the rotor, but not significantly during a stop or a small series of stops. This mapping process provides the window of opportunity to preclude BTV by anticipating (57 or 63) the upcoming thicker portion of the rotor and initiating torque reduction by use of the ABS or ESP modulator 39 with enough lead time to be effective. This is accomplished in the same manner of current ABS. The modulator 39 decreases brake pressure and hence the brake torque by isolating the circuit and then decaying brake fluid from this isolated circuit. Increasing or restoring brake torque is accomplished in the same manner except fluid is added back into the subject circuit by the modulator. The lead time is set by knowing system response time 31 (FIG. 3) for the given conditions of rotor speed from sensor 43 or 61, mean brake torque, and other system parameters. Therefore, mapping of the rotor from a BTV standpoint, does provide a solution as the larger threshold amount can be the trigger to recognize the BTV problem and then prepare a control strategy to compensate for it for the next or a subsequent revolution of the rotor. This recognition technique precludes the need to measure and appropriately interpret small changes in brake torque such as shown at 27 in FIG. 2 and also allows adequate anticipation or reaction time to initiate a control response inclusive of the system response lag time. This allows synchronization of the effects of the control to reduce brake torque, to exactly correspond with the thicker portion of the rotor passing through the brake caliper. The normal system control lags of detection, computation of correction, physical realization of amelioration control, can be overcome by the mapping technique, known timing of the subsequent cycles, and application of the anticipatory control.

Figure 6:
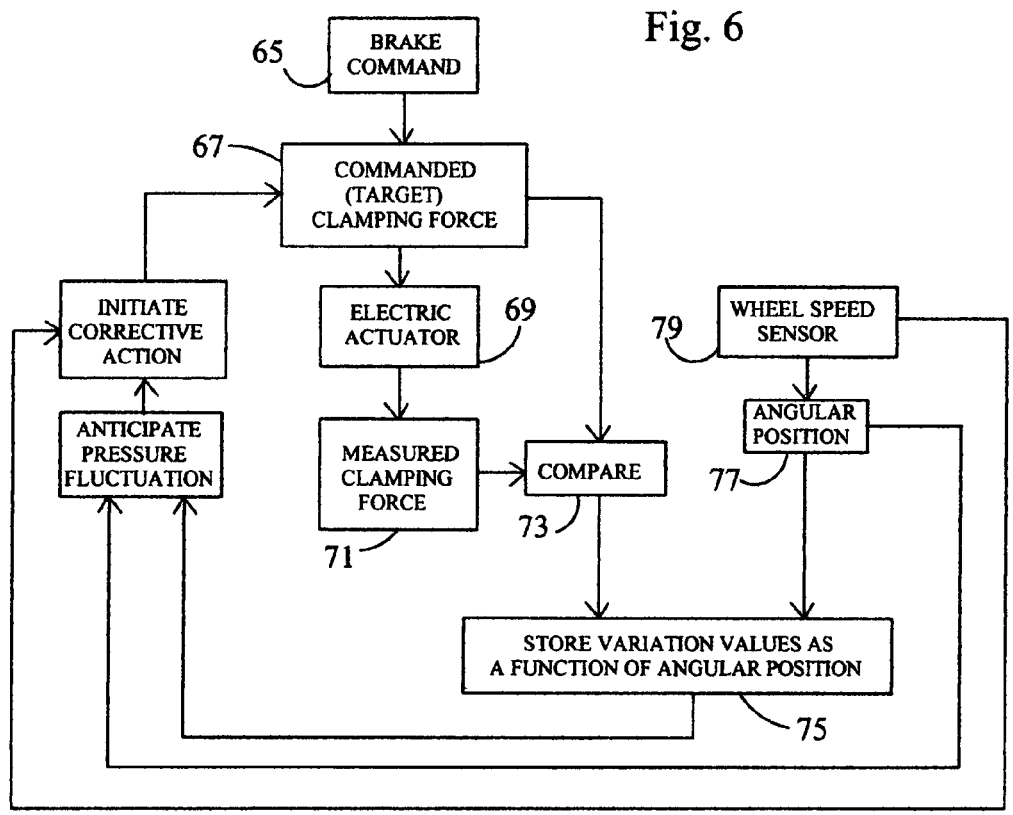
FIG. 6 is a block diagram illustrating one technique of compensation for disc thickness variations in an electric disc braking system.
Figure 7:
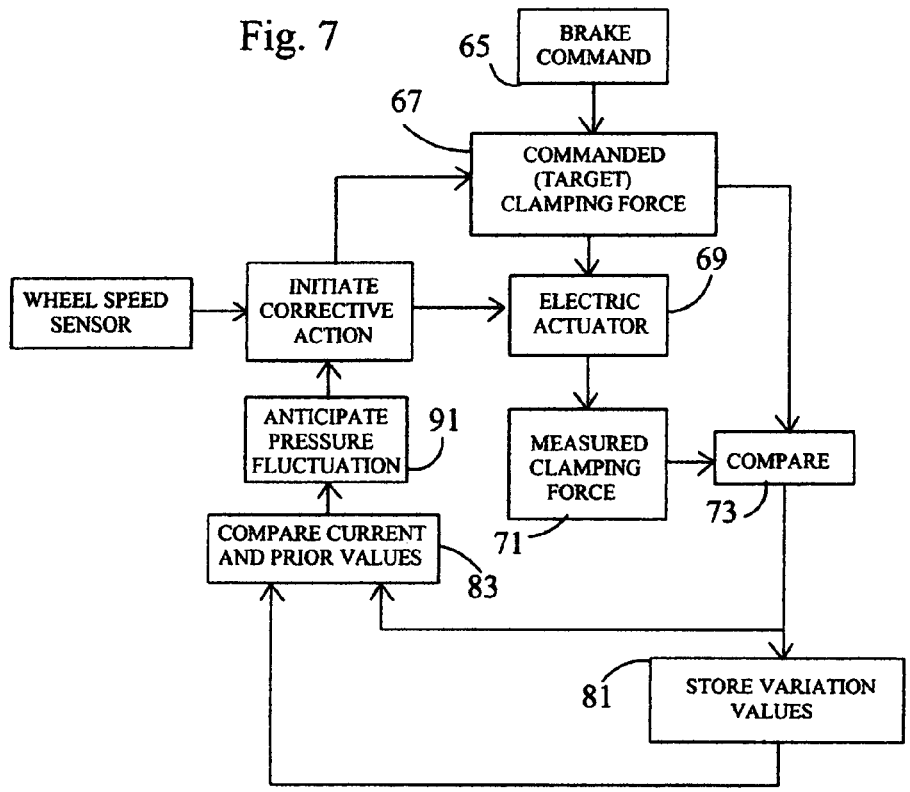
FIG. 7 is a block diagram illustrating another technique of compensation for disc thickness variations in an electric disc braking system.

FIGS. 6 and 7 illustrate the application of the concepts discussed so far to an electric disc brake system. The vehicle operator issues a brake command 65 specifying a desired brake caliper clamping force 67 which is conveyed to an electric brake actuator 69 applying a braking force to the rotor. During a low or moderate force brake apply, the electric disc brake can provide a constant target clamp force and simultaneously record the actual clamp force and/or brake torque via onboard transducers 71. A comparison 73 allows the BTV and hence the DTV of the rotor to be mapped and stored at 75 as a function angular position as provided by the sensor 77. Wheel speed sensor 79 and position or orientation sensor 77 are analogous to the sensor 43 and position detector 49 of FIG. 4. The anticipation and corrective action proceed as discussed in conjunction with that figure except for the fact that the corrective action is now applied to the electric actuator 69 preferably by modifying the target clamping force 67. In addition to the absolute rotor position technique of FIG. 4, registration or synchronization can be made by an inferred method as shown in FIG. 7. The results of comparison 73 are stored at 81 and current comparison values compared to previously stored ones at 83. Changes in the commanded clamping force 67 take place more slowly than changes in the measured force 71 allowing rotor thickness induced variations to be mapped over several wheel revolutions and compared one revolution to another establishing the synchronization for pressure fluctuation anticipation at 91.

In either FIG. 6 or 7, the mapping process provides the window of opportunity to preclude BTV by anticipating the upcoming thicker portion of the rotor and initiating torque reduction with enough lead time to be effective. As illustrated in FIG. 3, torque reduction commences at 85 in anticipation of the presentation of the thicker portion to the caliper pads at the time shown at 87. In addition, the controlled pressure increases and as a result, the mechanical resistance (stiction) also increases and can be compensated by an additional control pressure decrease. Thus the lead time 31 is set by knowing system response time for the given conditions of rotor speed, mean brake torque, and system voltage resulting in a corrected BTV as shown at 89.

Thus, while a preferred embodiment has been disclosed, numerous modifications will occur to those of ordinary skill in this art. Accordingly, the scope of the present invention is to be measured by the scope of the claims which follow.

What is claimed is:

1. In a vehicle braking system of the type having individually controlled brakes having respective angularly fixed and rotatable friction surfaces urged into contact by an operator initiated braking force for each of a plurality of rotatable vehicle wheels, a method of alleviating braking torque variations within a wheel revolution, comprising, for each wheel, the steps of:

sensing variations in braking force as a function of wheel angular position during a complete vehicle wheel revolution, initiating a reduction in braking force during a subsequent wheel revolution prior to the wheel reaching an angular position at which an increase in braking force was sensed during a previous wheel revolution, identifying a particular wheel angular position as a reference position, storing data indicative of the sensed variations as a function of wheel angular position relative to the reference position, and utilizing the stored data to determine the angular position at which braking force reduction is initiated.

2. In a vehicle braking system of the type having individually controlled brakes having respective angularly fixed and rotatable friction surfaces urged into contact by an operator initiated braking force for each of a plurality of rotatable vehicle wheels, a method of alleviating braking torque variations within a wheel revolution, comprising, for each wheel, the steps of:

sensing variations in braking force as a function of wheel angular position during a complete vehicle wheel revolution, initiating a reduction in braking force during a subsequent wheel revolution prior to the wheel reaching an angular position at which an increase in braking force was sensed during a previous wheel revolution, and identifying a particular wheel angular position as a reference position, wherein the vehicle braking system includes a wheel speed sensor for each wheel, and the step of identifying including sensing an angular anomaly generated by the wheel speed sensor, and wherein the wheel speed sensor includes a plurality of equiangularly spaced indicia one of which differs from each of the others and provides the angular anomaly.

3. In a vehicle braking system of the type having individually controlled brakes having respective angularly fixed and rotatable friction surfaces urged into contact by an operator initiated braking force for each of a plurality of rotatable vehicle wheels, a method of alleviating braking torque variations within a wheel revolution, comprising, for each wheel, the steps of:

(a) sensing variations in braking force as a function of wheel angular position during a complete vehicle wheel revolution;

(b) initiating a reduction in braking force during a subsequent wheel revolution prior to the wheel reaching an angular position at which an increase in braking force was sensed during a previous wheel revolution, (c) identifying a particular wheel angular position as a reference position, (d) storing data indicative of the sensed variations, (e) analyzing the stored data to identify repetitive patterns within the data, and wherein step (c) includes identifying the particular wheel angular position as the reference position based on an identified repetitive pattern identified in step (e).

4. In a vehicle braking system having individually controlled brakes each comprising a rotor fixed to and rotatable with a vehicle wheel, a relatively fixed caliper spanning a portion of the rotor, a pair of friction pads, one on each side of the rotor and supported by the caliper, and a brake actuator for urging the pads toward one another to apply a braking force and thus a braking torque to the rotor, the improvement comprising:

a pressure transducer for monitoring applied braking force and providing a signal indicative thereof;

a separating circuit for separating relatively rapid disc thickness variation indicative variations in the transducer signal from relatively slow operator applied braking force indicative variations in the transducer signal;

a memory for storing relatively rapid signal variations over a plurality of vehicle wheel revolutions;

a circuit utilizing the stored variations to anticipate future braking force variations; and a hydraulic pressure modulator responsive to the variation anticipating circuit to moderate the anticipated variations and resulting braking torque variations.

* * * * *